United States Patent Office 3,352,843
Patented Nov. 14, 1967

3,352,843
PHE²-ORN⁸-OXYTOCIN
Roger Boissonnas, Bottmingen, René Huguenin, Reinach, Basel-Land, Botond Berde, Basel, and Walter Schalch, Riehen, Switzerland, assignors to Sandoz Ltd. (also known as Sandoz A.G.), Basel, Switzerland
No Drawing. Filed Aug. 27, 1964, Ser. No. 392,595
Claims priority, application Switzerland, Aug. 30, 1963, 10,772/63, 10,773/63
3 Claims. (Cl. 260—112.5)

The present invention relates to a new polypeptide and to a process for its production.

The present invention provides the polypeptide of Formula I, its acid addition salts as well as therapeutical combinations thereof.

The present invention further provides a process for the production of Compound I and its acid addition salts which comprises splitting off the protective radicals R' and R" in one or more stages from a nonapeptide derivative of general Formula IV in which R' denotes a radical capable of protecting an amino radical in peptide synthesis, and R" denotes a radical capable of protecting a sulfhydryl radical in peptide synthesis, oxidizing the resulting nonapeptide of Formula V to give the polypeptide of Formula I and, when it is desired to produce an acid addition salt, reacting this with an organic or inorganic acid by methods known per se.

The nonapeptide derivative IV may, for example, be obtained by methods for the synthesis of peptides in actual use or described in the literature on the subject, it being possible to join together the amino acids in the order indicated in general Formula IV one at a time or by first forming constituent peptide units and joining these together.

The nonapeptide derivative IV may, for example, be produced in that a hexapeptide derivative of general Formula II,

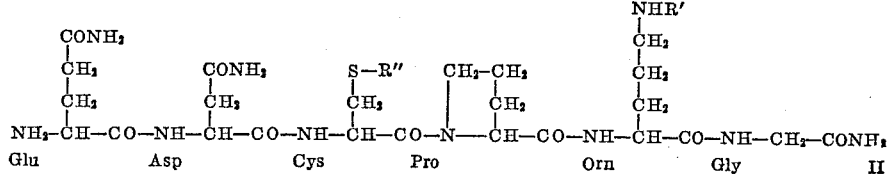

in which R' and R" have the above significance, is condensed with a reactive derivative of a free acid of general Formula III,

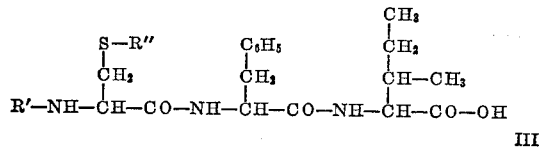

in which R' and R" have the above significance.

Examples of radicals for protecting the amino radical in the above process by temporarily blocking it are the carbobenzoxy, p-chlorobenzyloxy, p-toluenesulfonyl or triphenylmethyl radicals, while examples of radicals for

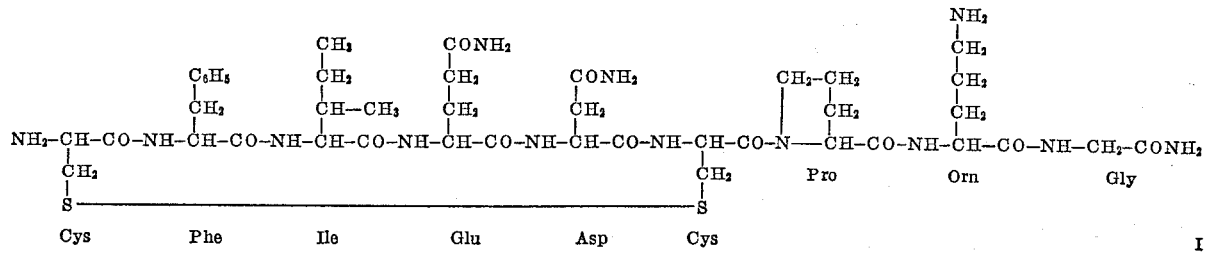

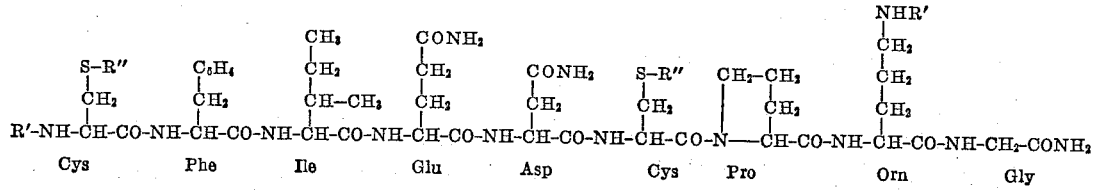

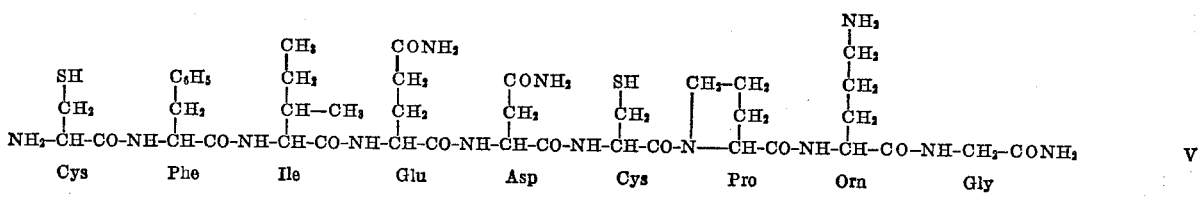

protecting the sulfhydryl radical are the benzyl, p-chlorobenzyl or p-xylyl radicals. It is preferred, however, to use the benzyl radical. Examples of reactive derivatives of a free acid of general Formula III are the azide, the p-nitrophenylester, the 2,4,5-trichlorophenylester, the unsymmetrical anhydrides as well as the reaction product of the acid III with dicyclohexylcarbodiimide.

It should be noted that the nonapeptide derivative IV need not be produced in the manner described above, but it may likewise be produced by condensation of two polypeptides other than the ones indicated above (or a polypeptide and an amino acid) in the form of their protected derivatives.

The starting materials for producing the nonapeptide derivative IV, insofar as they were hitherto unknown, may be obtained by methods for the synthesis of peptides in actual use or described in the literature on the subject, it being possible to join together the amino acids one at a time or by first forming constituent peptide units and joining these together.

Oxidation of the nonapeptide V to give the desired final product I may be effected by oxidation in aqueous solution at a pH value of 4 to 9, preferably with hydrogen peroxide or potassium ferricyanide or by introducing air or oxygen.

The resulting polypeptide I may be converted into its acid addition salts by reaction with inorganic or organic acids in manner known per se. Examples of acids suitable for acid salt formation with Compound I are as follows: hydrochloric, hydrobromic, sulfuric, fumaric, malic, maleic, acetic and tartaric acid.

The polypeptide of the invention differs from vasopressin in that it contains an ornithine radical in the place of the lysine radical (vasopressin from pigs) or the arginine radical (vasopressin from cattle), an isoleucine radical in place of the phenylalanine radical and a phenylalanine radical in place of the tyrosine radical. The polypeptide I differs from oxytocin in that it contains a phenylalanine radical in place of the tyrosine radical and an ornithine radical in place of the leucine radical. The new polypeptide I may, therefore, also be called $Phe^2$-$Orn^8$-oxytocin.

Compound I was a vasoconstrictive effect almost equal to that of natural vasopressins; however, as opposed to the natural vasopressins, compound I has virtually no antidiuretic effect and as opposed to natural oxytocin it has almost no oxytocic effect, and is thus suggested for use in therapy as a substance having a specific vasoconstrictive effect. This specific vasoconstrictive effect of compound I results from a direct influence on the vascular muscles; for this reason no appreciable side effects on the vegetative nervous system are produced as is the case with adrenalin and noradrenalin.

The properties of compound I are especially useful in the prophylaxis and therapy of parenchymatous bleeding, whereby infiltration of the tissues with compound I produces a pronounced ischaemic effect. The properties of compound I are, furthermore, of special use in surgery of the throat, nose and ear, in gynecology and obstetrics, in urology and dentistry.

A combination of compound I with a local anaesthetic shows especially valuable therapeutical properties.

It has hitherto been known that by the combination of adrenalin with a local anaesthetic it was possible to obtain a longer duration of anaesthesia and a decrease of local plethora and thus, a reduction of blood loss during surgery. Due to the known general side effects of adrenalin on blood circulation (for example suddden rise in blood pressure, an increase in the frequency of the heartbeats, secondary blood pressure decrease, collapse) and on the central nervous system (for example tension and excitation) as well as the frequently occurring reactive hyperaemia caused by the speeding up of local metabolism, it has recently been recommended to use, in place of adrenalin, vasopressin or vasopressin-like peptides in combination with a local anaesthetic, for example $Phe^2$-$Lys^8$-vasopressin, a synthetic analogue of lysine vasopressin which contains a phenylalanine radical in place of the tyrosine radical in the 2-position of lysine vasopressin.

It has now been found that by the combination of the new polypeptide I with a local anaesthetic it is possible to increase considerably the duration of local anaesthesia in comparison with the hitherto known combinations of adrenalin, vasopressin or vasopressin-like peptides with local anaesthetics. The amount of polypeptide I required for this purpose is considerably smaller than that of other vasopressin-like peptides or even than of adrenalin.

Due to its high local vasoconstrictive activity, the new polypeptide in combination with a local anaesthetic is therefore also especially indicated for decreasing local plethora and reducing blood loss during surgery. It is preferred to use for these combinations local anaesthetics which have a good water solubility and which are suitable for the preparation of stable, sterilizable solutions.

The polypeptide of the invention may be used as free base or as an addition salt with organic or inorganic acids, either on its own or in the form of appropriate medicinal preparations for administration, e.g., parenterally, enterally or intranasally. In order to produce such medicinal preparations, the compound is worked up with organic or inorganic adjuvants which are inert and physiologically acceptable. Examples of such adjuvants are as follows— tablets and dragees: lactose, starch, talc and stearic acid;
syrups: solutions of can sugar, invert sugar and glucose;
injectable solutions: water, alcohols, glycerin and vegetable oils;
suppositories: natural or hardened oils and waxes;
intranasal sprays: water, glycerin or other liquid substances tolerated by the mucous membranes.

The preparations may furthermore contain one or more suitable preserving, stabilizing or wetting agents, solubilizers, sweetening and coloring substances or flavorings.

In the follow examples all temperatures are indicated in degrees centigrade.

EXAMPLE 1

(a) *N-α-carbobenzoxy-N-δ-p-toluenesulfonyl-L-ornithyl-glycine ethyl ester*

104 g. of N-α-carbobenzoxy-N-δ-p-toluenesulfonyl-L-ornithine and 27 g. of glycine ethyl ester are dissolved in 450 cc. of acetonitrile, cooling is effected at 0°, 51 g. of dicyclohexylcarbodiimide are added and shaking is effected for 4 hours at room temperature. Precipitated dicyclohexylurea is filtered off and washed with acetonitrile. The whole filtrate is evaporated in a vacuum. The residue crystallizes after the addition of petroleum ether. After recrystallization from n-propanol, N-α-carbobenzoxy - N-δ-p-toluenesulfonyl-L-ornithyl-glycine ethyl ester is obtained; melting point 136°; $[α]_D^{22} = -7°$ (96% ethanol).

(b) *N-carbobenzoxy-L-prolyl-N-δ-p-toluenesulfonyl-L-ornithyl glycinamide*

90 g. of N-α-carbobenzoxy-N-δ-p-toluenesulfonyl-L-ornithyl-glycine ethyl ester are dissolved in 800 cc. of anhydrous acetic acid which has been saturated with hydrogen bromide. The solution is left to stand for one hour at 20°, evaporation is effected in a vacuum below 40° and the residue is carefully washed with diethyl ether. The residue is dissolved in 500 cc. of acetonitrile, 25 cc. of triethylamine and 43 g. of N-carbobenzoxy-L-proline are added, cooling is effected at 0°, 35.5 g. of dicyclohexylcarbodiimide are added and shaking is effected over night at 20°. After filtering off dicyclohexylurea, the filtrate is evaporated in a vacuum at 30°, the residue is dissolved in ethyl acetate and this solution is washed with dilute sulfuric acid and aqueous ammonia. After drying over sodium sulfate, the ethyl acetate is evaporated in a vacuum and the residue is dissolved in 1 litre of absolute ethanol. The solution is cooled at 0°, saturated with ammonia and left to stand over night at 20°. After evaporating in a vacuum at 30°, the residue is dissolved in 100 ml. of dimethylformamide and crystallized by the addition of 1500 ml. of ethyl acetate. N-carbobenzoxy - L - prolyl - N - δ - p-toluenesulfonyl-L-ornithyl-glycinamide is obtained: melting point 122° (decomposition). $[\alpha]_D^{22}$=—46° (95% glacial acetic acid).

(c) *N - carbobenzoxy - L - glutaminyl-L-asparaginyl-S-benzyl - L - cysteinyl-L-prolyl-N-δ-p-toluenesulfonyl-L-ornithyl-glycinamide*

100 g. of N-carbobenzoxy-L-prolyl-N-δ-p-toluenesulfonyl-L-ornithyl-glycinamide are dissolved in 500 cc. of anhydrous acetic acid which has been saturated with hydrogen bromide, the solution is left to stand for one hour at 20° and evaporation is effected in a vacuum below 40°. The residue is carefully washed with diethyl ether and then added to a solution of 100 g. of N-carbobenzoxy - L - glutaminyl - L - asparaginyl - S - benzyl-L-cysteinyl azide [Boissonnas & coll., Helv. chim. Acta, 38, 1491 (1955)] and 26 cc. of triethylamine in 1000 cc. of dimethylformamide. The mixture is left to stand over night at 20°, 3000 cc. of ethyl acetate are added thereto, the precipitate is filtered off and washing is effected with ethyl acetate. N - carbobenzoxy-L-glutaminyl-L-asparaginyl - S - benzyl - L - cysteinyl-L-prolyl-N-δ-p-toluenesulfonyl-L-ornithyl-glycinamide is obtained; melting point 188° (decomposition); $[\alpha]_D^{20}$=—33° (dimethylformamide).

(d) *N - carbobenzoxy - S-benzyl-L-cysteinyl-L-phenylalanyl - L - isoleucyl - L-glutaminyl-L-asparaginyl-S-benzyl - L - cysteinyl-L-prolyl-N-δ-p-toluenesulfonyl-L-ornithyl-glycinamide*

50 g. of N-carbobenzoxy-L-glutaminyl-L-asparaginyl-S - benzyl - L-cysteinyl-L-prolyl-N-δ-p-toluenesulfonyl-L-ornithyl-glycinamide are dissolved in 250 cc. of anhydrous acetic acid which has been saturated with hydrogen bromide and the solution is left to stand for one hour at 20°. After evaporating the solvent in a vacuum below 40°, the residue is carefully washed with diethyl ether and a solution of 31.1 g. of N-carbobenzoxy-S-benzyl-L-cysteinyl-L-phenylalanyl-L-isoleucyl-azide and 7.5 cc. of triethylamine in 250 cc. of dimethylformamide is added thereto. The mixture is left to stand for 2 days at 20°, 1000 cc. of ethyl acetate are then added and the precipitate is washed with ethyl acetate. After drying in a vacuum at 30°, the product is washed with warm methanol. N - carbobenzoxy - S-benzyl-L-cysteinyl-L-phenylalanyl - L - isoleucyl - L - glutaminyl-L-asparaginyl-S-benzyl - L - cysteinyl - L-prolyl-N-δ-p-toluenesulfonyl-L-ornithyl-glycinamide is obtained. Melting point 242°; $[\alpha]_D^{21}$=—40° (dimethylformamide).

(e) *L - cysteinyl - L - phenylalanyl - L - isoleucyl - L - glutaminyl - L - asparaginyl-L-cysteinyl-L-prolyl-L-ornithyl-glycinamide*

The necessary amount of sodium or potassium metal is added to a solution of 5 g. of N-carbobenzoxy-S-benzyl-L - cysteinyl - L - phenylalanyl-L-isoleucyl-L-glutaminyl-L - asparaginyl -S- benzyl - L-cysteinyl-L-prolyl-N-δ-p-toluenesulfonyl-L-ornithyl-glycinamide in 1200 cc. of dry liquid ammonia, while stirring at the boiling temperature of the solution, to give a permanent blue coloration. After the addition of 3 g. of ammonium chloride, the solution is evaporated to dryness. The residue contains L - cysteinyl - L- phenylalanyl - L - isoleucyl - L - glutaminyl - L - asparaginyl - L - cysteinyl - L - prolyl- L- ornithyl-glycinamide.

(f) *Phe²-Orn⁸-oxytocin*

The residue, containing L-cysteinyl-L-phenylalanyl-L-isoleucyl - L - glutaminyl - L - asparaginyl - L - cysteinyl - L - prolyl - L - ornithyl - glycinamide, is dissolved in 5 litres of 0.01 N acetic acid and oxidized at a pH value of 6.5–8.0 by introducing air or oxygen for one hour at 0–40°. The solution is brought to a pH value of 4.0–5.0 and after the addition of 50 g. of sodium chloride or 0.64 g. of methanesulfonic acid or 0.76 g. of trifluoroacetic acid, evaporation to dryness is effected, whereby a dry powder results which keeps well. It may be stored and when used it may be dissolved to give a clear solution. However, the solution may also be used as such, if desired after diluting with water or a salt solution.

In order to remove the inorganic salts, the above powder obtained after the addition of trifluoroacetic acid may be subjected to counter current distribution in the system sec. butanol/water/trifluoroacetic acid 120:160:1. After 200 transfer stages the substance is present in tubes 47 to 66 with a maximum in tube 56 (K=0.39). After evaporation, the active polypeptide is obtained in a good yield in the form of its hydroscopic trifluoroacetate, which behaves uniformly in chromatography and electrophoresis. Migration in paper electrophoresis at a pH value of 5.8 and 40 v./cm.: 49 mm. in 60 minutes (the histidine used as standard migrates 65 mm.). Migration in paper electrophoresis at a pH value of 1.9 and 40 v./cm.: 68 mm. in 60 minutes (the tryptophane used as standard migrates 66 mm.). Rf in paper chromatography in the system isoamyl alcohol/pyridine/water 35:35:30=0.25. Total hydrolysis (16 hours, 110°, 6 N HCl) yields the following amino acids in equimolecular quantities: cystine, glutamic acid, asparaginic acid, proline, ornithine, glycine, phenylalanine and isoleucine. The compound has the following biological activities: 120 IU/mg. on the blood pressure of the rat, 0.6 IU/mg. on the inhibition of diuresis of the rat and approximately 1 IU/mg. on the uterus of the rat.

EXAMPLE 2

The same procedure as in Example 1 is used, except that final oxidation is effected at 0–40° by the addition of 7.5 cc. of a N solution of hydrogen peroxide in water at a pH value of 4.0–9.0 (instead of oxidation by introducing air or oxygen).

EXAMPLE 3

The same procedure as in Example 1 is used, except that final oxidation is effected at 0–35° by the addition of 6.7 cc. of a N solution of potassium ferricyanide in water at a pH value of 5.5–7.5.

EXAMPLE 4

Solution for infiltration anaesthesia:

| | |
|---|---|
| Phe²-Orn⁸-oxytocin _____ g__ | 0.0005 |
| 2-diethylamino-2',6'-aceto-xylidide hydrochloride (lidocaine chloride) _____ g__ | 5.0 |
| Trichloro-isobutyl alcohol _____ g__ | 5.0 |
| Ethyl alcohol 94%, analytically pure _____ g__ | 5.0 |
| Glacial acetic acid _____ g__ | 1.0 |
| Sodium acetate.3H₂O _____ g__ | 2.0 |
| Distilled water to make up one litre. | |

*Production*

The glacial acetic acid and the sodium acetate are dissolved in 900 ml. of distilled water, a solution of the trichloro-isobutyl alcohol in the same amount by weight of analytically pure 94% ethyl alcohol is added while stirring vigorously, stirring is effected until all is dissolved, lidocaine chloride is added and, after this has dissolved, Phe²-Orn⁸-oxytocin is added; water is then added to make up one litre, filtration is effected through a bacteria filter and the solution is filled in ampoules.

EXAMPLE 5

Solution for block anaesthesia:

| | |
|---|---|
| Phe²-Orn⁸-oxytocin _____ g__ | 0.001 |
| p-Aminobenzoyl - diethylamino-ethanol hydrochloride (novocaine hydrochloride) _____ g__ | 10.0 |
| Anhydrous disodium phosphate _____ g__ | 2.0 |
| Citric acid.1H₂O _____ g__ | 3.0 |

Distilled water to make up one litre.

Production

The citric acid, the disodium phosphate and the novocaine hydrochloride are dissolved in 900 ml. of distilled water while stirring, the Phe²-Orn⁸-oxytocin is added, water is added to make up one litre, filtration is effected through a membrane filter, the solution is filled in ampoules and sterilized by heating for 6 minutes at 120°.

EXAMPLE 6

Solution for surface anaesthesia:

| | |
|---|---|
| Phe²-Orn⁸-oxytocin _____ g__ | 0.002 |
| p-Aminobenzoic acid β-diethylamino - β - isobutylethyl ester methanesulfonate (leucinocainum [methanesulfonate]) _____ g__ | 100 |
| Glacial acetic acid _____ g__ | 20 |
| Sodium acetate.3H₂O _____ g__ | 20 |
| Propyl-p-hydroxybenzoate _____ g__ | 1.0 |
| Methyl-p-hydroxybenzoate _____ g__ | 2.0 |

Distilled water to make up one litre.

Production

The propyl-p-hydroxybenzoate, the methyl-p-hydroxybenzoate, the glacial acetic acid and the sodium acetate are dissolved in 800 ml. of distilled water, the leucinocainum methanesulfonate is added and, after dissolving, the Phe²-Orn⁸-oxytocin is added. After adding water to make up one litre, the process is further effected as described in Example 1.

EXAMPLE 7

Solution for surface anaesthesia:

| | |
|---|---|
| Phe²-Orn⁸-oxytocin _____ g__ | 0.001 |
| (±)-N-(2-propylaminopropionyl) - 2-toluidine hydrochloride (exadrin) _____ g__ | 30.0 |
| Sodium chloride _____ g__ | 8.0 |
| Sodium acetate.3H₂O _____ g__ | 1.0 |
| Glacial acetic acid _____ g__ | 0.5 |
| Methyl-p-hydroxybenzoate _____ g__ | 1.0 |

Distilled water to make up one litre.

Production

The methyl-p-hydroxybenzoate, the sodium chloride, the glacial acetic acid and the sodium acetate are dissolved in 800 ml. of distilled water, the (±)-N-(2-propylaminopropionyl)-2-toluidine hydrochloride is added and, after dissolving, the Phe²-Orn⁸-oxytocin is added. After adding water to make up one litre, the process is further effected as described in Example 1.

What is claimed is:

1. The polypeptide of the formula:

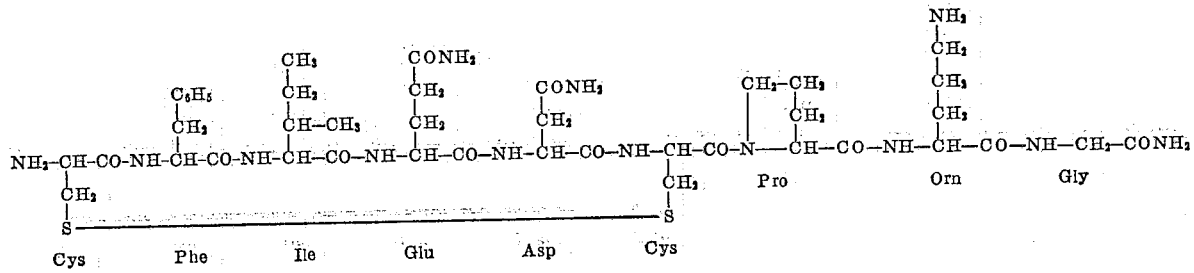

and its physiologically acceptable acid addition salts wherein all the amino acid groupings except glycine are of L-configuration.

2. L - cysteinyl - L-pyhenylalanyl-L-isoleucyl-L-glutaminyl - L - asparaginyl-L-cysteinyl-L-propyl-L-ornithyl-glycinamid and its acid addition salts.

3. A compound of the formula:

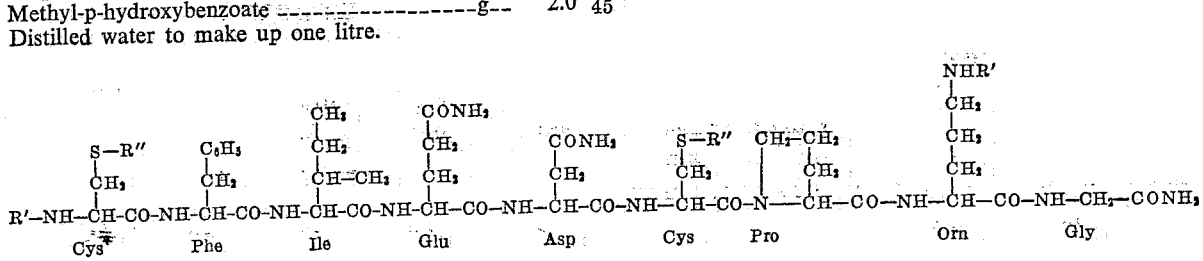

wherein R' is selected from the group consisting of carbobenzoxy, p-chlorocarbobenzyloxy, p-toluenesulphonyl and triphenylmethyl, and R" is selected from the group consisting of benzyl, p-chlorobenzyl and p-xylyl, all the amino acid groupings except glycine being of L-configuration.

References Cited

Boissonnas et al.: Experientia 17, 377–390 (1961).
Huguenin et al.: Helvetica Chimic Acta 46, 1669–1676 (1963).

LEWIS GOTTS, *Primary Examiner.*

ELBERT L. ROBERTS, *Examiner.*